(12) United States Patent
Vadivelu

(10) Patent No.: US 7,674,320 B2
(45) Date of Patent: Mar. 9, 2010

(54) PREPARING HYDROGEN FOR CRYO-ADSORBER STORAGE

(75) Inventor: Senthil Kumar Vadivelu, Bangalore (IN)

(73) Assignee: GM Global Technology Operations, Inc., Detroit, MI (US)

( * ) Notice: Subject to any disclaimer, the term of this patent is extended or adjusted under 35 U.S.C. 154(b) by 138 days.

(21) Appl. No.: 11/877,729

(22) Filed: Oct. 24, 2007

(65) Prior Publication Data

US 2009/0107155 A1 Apr. 30, 2009

(51) Int. Cl.
*B01D 53/02* (2006.01)
(52) U.S. Cl. .................. 95/115; 95/90; 95/94; 95/116; 95/141; 96/108; 96/126; 96/135; 420/900; 423/644; 423/648.1; 423/658.2
(58) Field of Classification Search .............. 95/90, 95/94, 115, 116, 141; 96/108, 126, 135; 420/900; 423/644, 648.1, 658.2
See application file for complete search history.

(56) References Cited

U.S. PATENT DOCUMENTS

| | | | | |
|---|---|---|---|---|
| 4,154,364 A | * | 5/1979 | Hagiwara et al. | 220/560.12 |
| 4,783,329 A | * | 11/1988 | Maeland et al. | 423/644 |
| RE35,725 E | * | 2/1998 | Briesacher et al. | 95/115 |
| 6,383,259 B1 | * | 5/2002 | Lim et al. | 95/90 |
| 6,503,298 B1 | * | 1/2003 | Monzyk et al. | 95/96 |
| 6,733,563 B2 | * | 5/2004 | Fujita et al. | 75/352 |
| 7,166,150 B2 | * | 1/2007 | Torgersen et al. | 96/108 |
| 7,378,188 B2 | * | 5/2008 | Struthers et al. | 429/218.2 |
| 2001/0027724 A1 | * | 10/2001 | Oshima et al. | 96/135 |
| 2003/0209296 A1 | * | 11/2003 | Aono et al. | 148/421 |
| 2005/0061685 A1 | * | 3/2005 | Struthers et al. | 206/0.7 |
| 2006/0101943 A1 | * | 5/2006 | Snow et al. | 75/252 |

FOREIGN PATENT DOCUMENTS

| | | |
|---|---|---|
| JP | 6068433 | 8/1994 |
| JP | 2003065497 | 3/2003 |
| JP | 2007046655 | 2/2007 |
| JP | 2007046656 | 2/2007 |

OTHER PUBLICATIONS

Written Opinion of the International Searching Authority for PCT/US2008/076935 dated Mar. 27, 2009.
International Search Report for PCT/US2008/076935 dated Mar. 27, 2009.

* cited by examiner

*Primary Examiner*—Robert J Hill, Jr.
*Assistant Examiner*—Christopher P Jones
(74) *Attorney, Agent, or Firm*—Reising Ethington P.C.

(57) ABSTRACT

Hydrogen gas at a hydrogen refueling site is cooled below liquid nitrogen temperature (e.g., about 80K) for more efficient adsorption of hydrogen on hydrogen adsorbent particles in the fuel storage of a hydrogen powered vehicle. When compressed hydrogen gas is available it may be cooled with liquid nitrogen and then sub-cooled below about 70K by a Joule-Thompson expansion. When liquid hydrogen provides hydrogen gas it may be cooled below liquid nitrogen temperatures by mixing with liquid hydrogen or by heat exchange with liquid hydrogen.

12 Claims, 3 Drawing Sheets

PREPARING HYDROGEN FOR CRYO-ADSORBER STORAGE

TECHNICAL FIELD

This disclosure pertains to the preparation of hydrogen gas for adsorption and temporary storage in a cryogenic adsorption storage vessel serving as a fuel tank for a hydrogen-powered vehicle. More specifically, this disclosure pertains to pressure and temperature conversion of compressed hydrogen gas, or of liquid hydrogen, to cold hydrogen gas suitable for timely adsorption by high surface area hydrogen adsorbing particles.

BACKGROUND OF THE INVENTION

Adsorbent particles with nanometer-size pores (nanoporous particles) like metal-organic framework (MOF) materials, exhibit a capacity to store hydrogen at cryogenic temperatures and moderate pressures (e.g., 20 bar). Members of this family of materials have pore sizes in the mesoporous range (greater than twenty angstroms) and low densities for crystalline materials. Metal-organic framework materials are often characterized by metal-oxygen clusters connected by molecular struts such as multifunctional organic moieties. For example, zinc-oxygen clusters may be connected in a three dimensional network with 1,4-benzenedicarboxylate groups (available as MOF-5). Such crystalline materials usually don't have molecular walls that impede diffusion of guest molecules such as hydrogen. The pore size of the metal-organic framework materials may be varied by selection of the wire-like molecules interconnecting the metal-oxide clusters.

Hydrogen gas under pressure and at a suitably cold temperature may be brought into contact with the adsorptive particles and stored under pressure in the porous material. The hydrogen storage may be maintained at a suitable storage temperature and pressure until there is a need to withdraw hydrogen for a fuel cell or other hydrogen-consuming power plant or device. Such an adsorption-desorption process is reversible.

Metal-organic framework materials and other solid adsorbents thus provide a basis for on-board storage of hydrogen at temperatures at or below that of liquid nitrogen (about 80K) and pressures of about 20 bar. A volume of adsorbent particles contained in a vessel adapted to maintain the specified temperature and pressure of the hydrogen-containing material would provide the basis for a fuel tank for a vehicle. The tank would have openings for storage and withdrawal of hydrogen.

Hydrogen could be made available at fixed, geographically located "hydrogen stations" in the form of compressed hydrogen gas ($CGH_2$) or as liquid hydrogen ($LH_2$). Hydrogen gas would then be prepared at the hydrogen-fuel station for passage into contact with the adsorptive contents of a hydrogen-fuel tank of a vehicle brought to the station for re-fueling. Desirably, the hydrogen is passed into contact with the adsorbent particles at pressure and temperature conditions that permit rapid refilling of the adsorbent materials and that can be readily attained at the fuel station.

SUMMARY OF THE INVENTION

In one embodiment of the invention, hydrogen available at a fixed location is prepared for timely adsorption into a mass of particles of hydrogen storage material (such as MOF particles) contained in a suitable fuel storage vessel on a vehicle. In the case of MOF particles, hydrogen may be stored at a temperature of about 80K and a pressure of the order of 20 bar. The adsorptive storage pressure may, for example, be in the range of about 10 to 30 bar. However, hydrogen available at a fixed service location may not be at the temperature and pressure regime of the adsorptive storage material. Hydrogen may be available, for example, via a compressed gas pipe network supply, typically at 350 to 450 bar and ambient temperature. In another example, liquid hydrogen may be delivered to a fueling location, typically at about 20K and one bar pressure. Practices of the invention will be illustrated using each of these two different hydrogen availability conditions.

In accordance with illustrative embodiments of the invention, hydrogen is delivered to a refueling site which is adapted with liquid nitrogen for cooling, one or more suitable, insulated storage vessels, heat exchangers, insulated piping, and pumping devices to prepare hydrogen for storage on adsorbent particles and to circulate the cold and pressurized hydrogen gas to and from an arriving vehicle to refill its on-board hydrogen storage. Hydrogen is made available at a purity level suitable for the requirements of the on-board power device, such as a fuel cell, in which the $H_2$ is consumed. In one embodiment, hydrogen is processed at the service location for circulation through on-board nanoporous particulate material in an insulated vehicle hydrogen fuel tank at a pressure of about 20 bar and a temperature below or about 80K. Circulation of hydrogen between the processing capability of the service location and the on-vehicle hydrogen adsorptive material is continued for a matter of minutes until the hydrogen storage capacity of the adsorptive media has been replenished. Circulation of hydrogen gas at below 80K and about 20 bar facilitates adsorption of hydrogen into the pores of the particulate storage material and removes heat released by the adsorption process. In accordance with embodiments of this invention, hydrogen gas is cooled to a desired temperature below 80K to reduce hydrogen re-circulation rates through the MOF or other hydrogen storage medium.

Where compressed hydrogen gas (e.g., ambient temperature, 350 bar) is utilized at the service site, the pressurized gas may be expanded before and/or after it flows through a heat exchanger using liquid nitrogen (at about 80K) as the cooling medium. This is an efficient heat exchange process and hydrogen gas at a temperature of about 80K and a suitable pressure is obtained. It is now desired to further cool the hydrogen gas to a temperature below about 70K for more rapid adsorption by the storage media and removal of the heat of adsorption. In this embodiment of the invention, the hydrogen gas at 80K is throttled isenthalpically, a Joule-Thompson (JT) expansion, from a predetermined pressure of about 153 bar and temperature of about 80K to a pressure of about 20K and a temperature of about 68K. This expansion-cooled hydrogen is then circulated into contact with the hydrogen storage medium. Hydrogen re-circulated from the storage vessel may be recompressed for combination with additional hydrogen and for heat exchange with liquid nitrogen and subsequent JT expansion.

The throttling (JT isenthalpic expansion) of the nitrogen cooled hydrogen is analyzed and specified to produce a sub-cooled hydrogen stream that facilitates timely replenishment of the particulate hydrogen storage medium.

When liquid hydrogen is used at the service site, hydrogen is also processed for circulation through the particulate adsorption mass at a pressure of about 20 bar and a temperature below 70K.

Hydrogen gas boil-off from liquid hydrogen (about 20K) storage is compressed and conveyed to service-site gas storage at a pressure above, for example, 20 bar, suitably about 10 to 30 bar. Upon a demand, hydrogen is withdrawn form this pressurized hydrogen storage and passed through a liquid nitrogen cooled heat exchanger. For example, hydrogen gas at a pressure just above 20 bar is cooled with liquid nitrogen to below about 77-80K. The hydrogen is then further cooled to 33K or higher by spray injection of liquid hydrogen into the nitrogen-cooled hydrogen stream. Or the hydrogen at 77K may be cooled by heat exchange with liquid hydrogen. Again, this chilled hydrogen steam at about 20 bar and T<70K is circulated through the on-vehicle, adsorptive hydrogen storage material.

A hydrogen gas stream that has been depleted and warmed by passage through the fuel tank may be re-processed and recirculated, or stored in the service-site apparatus.

Other embodiments and advantages of this disclosure will be apparent from the following descriptions of exemplary embodiments of the invention.

DESCRIPTION OF EMBODIMENTS

An objective of the disclosed practices and embodiments is to reduce recirculation rates of cooled hydrogen required in refueling a cryo-adsorber fuel tank by sub-cooling the hydrogen feed below temperatures obtainable by cooling the hydrogen with liquid hydrogen.

Nano-porous adsorbents like metal-organic frameworks (MOFs) exhibit a good capacity to store hydrogen at cryogenic temperatures and high pressures. During the refueling of a cryo-adsorber fuel tank containing such adsorbents, the heat of adsorption must be removed continuously by continued circulation of cool hydrogen gas. It is contemplated that liquid nitrogen ($LN_2$) may be used to cool hydrogen gas to a temperature (about 80K) suitable for refueling of the adsorbent particles. However, it is now determined that if liquid nitrogen alone is used for cooling, very high feed flow rates are required to meet the refueling time targets. Sub-cooling (<80 K) the feed reduces the required feed flow rate.

Thermodynamic and kinetic simulations of hydrogen adsorption at various temperatures show that a 90.37 kg bed of MOF-5 with a feed of hydrogen gas at 80K requires flow rates into the adsorbent bed of 68 g/s and 136.5 g/s to achieve a 10 and 5 minutes refueling, respectively. This data (refueling time in minutes versus gas flow rate in g/s) for the MOF-5 bed is presented graphically in FIG. 1. The upper curve of dark-filled circles summarizes refueling times for hydrogen at 80K. The four progressively lower curves present refilling times for hydrogen streams at 75K, 70K, 65K, and 60K, respectively. It is seen that the colder hydrogen streams are adsorbed at substantially lower hydrogen flow rates than attained with the 80K stream.

Figure 1:
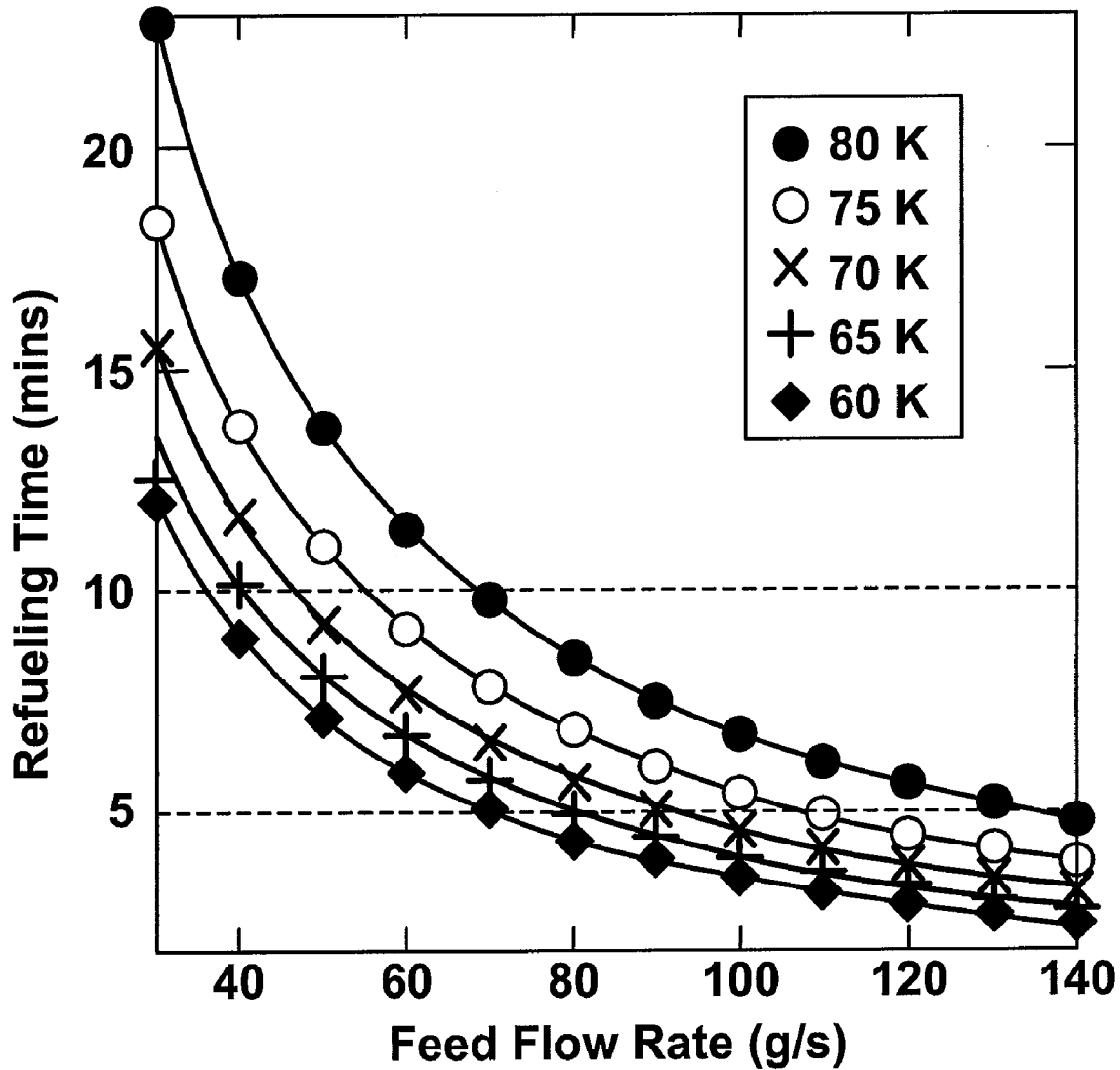
FIG. 1 is a graph of fueling time (minutes) vs. hydrogen feed flow rate (g/s) to a 90 kg bed of MOF-5. Flow rate curves for hydrogen at 60K, 65K, 70K, 75K, and 80K are presented. The horizontal dotted lines are for arbitrary refueling times of five minutes and ten minutes, respectively, for the 90 kg bed.

Contemplated hydrogen fuel dispensers are expected to have a flow capacity of about 30 to 60 g/s. Hence, to achieve the refueling time targets with an 80 K feed it is necessary to use a number of dispenser pumps in tandem, incurring higher capital and operating costs for the fuel station. As illustrated by the data of FIG. 1, hydrogen circulation between a service center and a fuel tank can be reduced significantly using a feed of hydrogen gas sub-cooled below about 80K, a temperature that may be obtained by heat exchange with liquid nitrogen.

Hydrogen Supplied as a Compressed Gas

Figure 2:
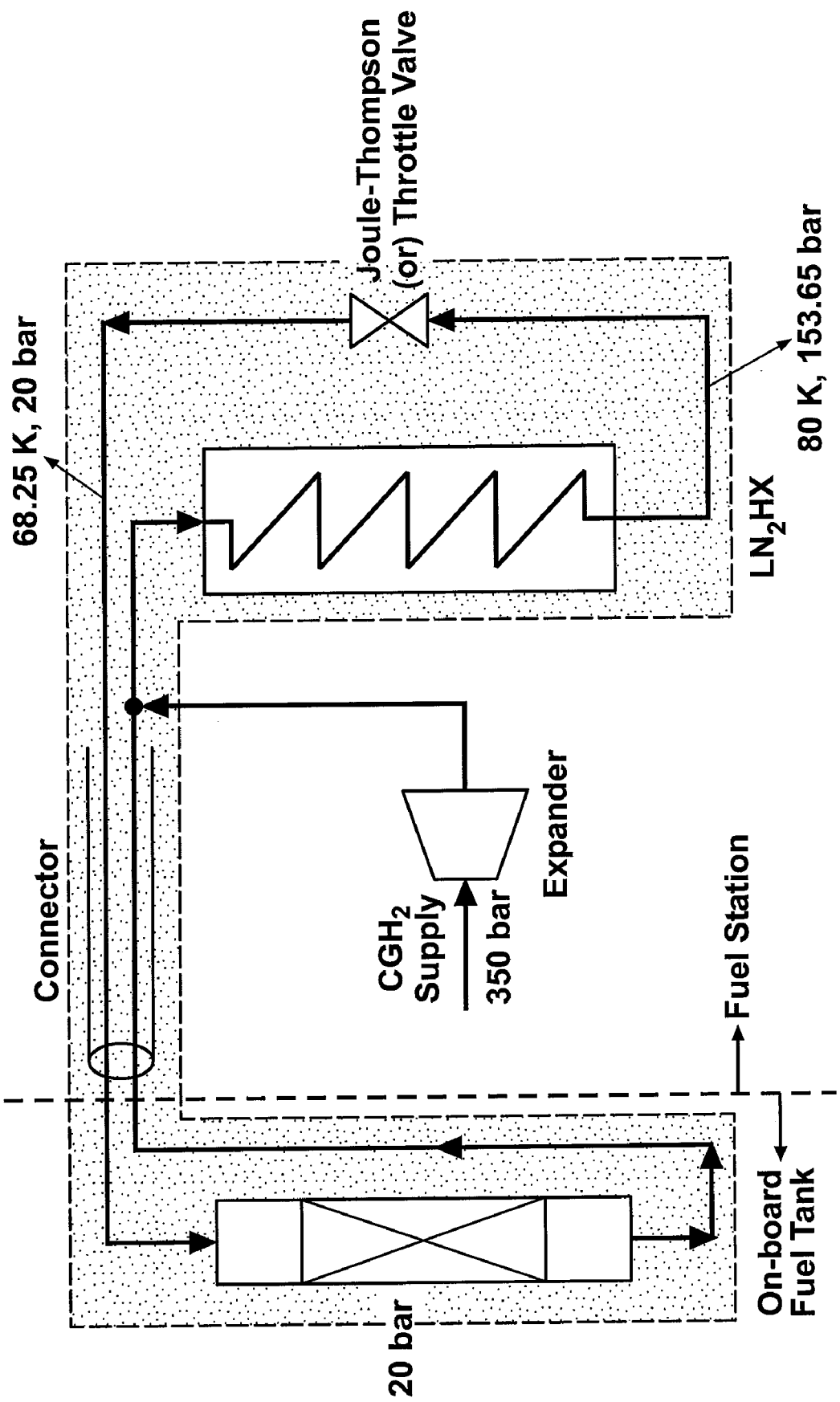
FIG. 2 is a schematic layout of a thermally insulated on-board fuel tank temporarily connected to a fuel station for the preparation of compressed hydrogen gas for adsorption by particulate adsorptive material in the fuel tank. The dashed line enclosed dotted portions of the figure indicate processing equipment and hydrogen flow lines that are thermally insulated.

In accordance with one illustrative embodiment of the invention, hydrogen is supplied to a fuel station via a compressed gas pipe network supply, typically at 350 to 450 bar and ambient temperature. FIG. 2 is a schematic drawing, illustrating processing elements of a fuel station to the right of the vertical dashed line and an on-board fuel tank of a vehicle (the vehicle is not shown) to the left of the vertical dashed line. A compressed hydrogen gas supply is indicated with the horizontal line and arrow labeled as $CGH_2$ supply in the figure. The pressure of the $CGH_2$ supply is labeled as 350 bar in FIG. 2 although typical pressures may range as high as 450 bar.

Low temperature processing equipment and piping of the fuel station and on board fuel tank would be thermally insulated to maintain the low temperatures obtained in the processing of hydrogen. In FIG. 2 the dashed-line enclosed dotted areas indicate processing stages and flow lines that would be insulated.

By way of example, an on-board vehicle fuel tank may comprise a round cylindrical steel pressure vessel with a longitudinal flow axis. The pressure vessel may have an inlet at one end of the flow axis and an outlet at the other end. The vessel is sized to contain several (e.g., seven) cylindrical, flow through cartridges filled with particles of MOF-5 or other suitable material for absorbing and releasing hydrogen gas at specified temperature and pressure ranges. For example, the material may be specified to store hydrogen at a pressure of about 20 bar and at a temperature below 80K, preferably below 70K. The cartridges are constructed for flow of hydrogen from one end to the other. The cartridges may also be constructed to be placed in parallel alignment within the fuel tank vessel for simultaneous parallel flow of hydrogen through them from a vessel header space at the upstream end of the cartridges and fuel tank to a collector space at the outlet end of the vessel.

The hydrogen content of a fuel tank is replenished by introducing hydrogen gas at about 20 bar and <70K at the inlet of the tank from a Connector apparatus attached to a hydrogen delivery line form the Fuel Station. As hydrogen flows through the several cartridges some hydrogen is adsorbed and heat is released to the flowing stream. A somewhat warmer and lower volume hydrogen stream leaves the fuel tank and enters the return line portion of the Connector for reprocessing in the processing section of the Fuel station. The circulation of hydrogen through the fuel tank is continued for a period of minutes until the adsorbent material has been replenished with hydrogen. This refilling operation is expedited by the preparation of hydrogen in the Fuel Station in accordance with this invention. Hydrogen flow connections to and from the Fuel Tank facilitate the use of a recycling-flow Connector illustrated schematically in FIG. 2.

The preparation of hydrogen gas for delivery to the On-board Fuel Tank is accomplished using the processing strategy of the Fuel Station illustrated in FIG. 2.

The high pressure of the $CGH_2$ stream may be utilized in conveying the hydrogen through a heat exchanger for cooling close to liquid nitrogen temperature (80K) and then for a Joule-Thompson expansion to obtain further cooling of the hydrogen several degrees below 80K. The heat exchange between the hydrogen steam and liquid nitrogen is indicated by the vertical heat exchange box labeled $LN_2HX$ in FIG. 2. The heat exchange flow path of the compressed hydrogen gas is downward as it is cooled as illustrated by the flow lines and directional arrows of FIG. 2. The cooled hydrogen at a predetermined pressure is then expanded as indicated by the Joule-Thompson or throttle valve schematic of FIG. 2.

The high pressure of the incoming $CGH_2$ stream may also be used in a compressor, not shown, for compressing a recycle stream from an On-board Fuel Tank to a pressure for its addition to the expanded compressed hydrogen. The hydrogen recycle stream is indicated by a vertical flow line from the On-board Fuel Tank in FIG. 2. It enters the return passage of Connecter and is compressed for merging with expanded compressed hydrogen gas at the closed circle merger location of FIG. 2, upstream of the combined hydrogen streams entry into the $LN_2HX$ heat exchange step. Thus, the high pressure hydrogen stream may be expanded from its initial pressure of 350 to 450 bar in one or more expansion steps, that may include Expander in FIG. 2, to accommodate such processing and to reach a predetermined temperature for a JT expansion.

The reduced pressure hydrogen gas and any recycled hydrogen form the On-board Fuel Tank is cooled with liquid nitrogen ($LN_2HX$) to a temperature of about 80K, the temperature of the nitrogen. Liquid nitrogen is suitably provided for such use in the Fuel Station. The pressure of the hydrogen stream may be reduced somewhat as it is cooled and passes through the $LN_2HX$ heat exchanger. The pressure of the hydrogen stream may then be further reduced if necessary to obtain a maximum desired temperature reduction by passage through a throttle valve in a Joule-Thompson isenthalpic expansion. The inlet pressure for the JT expansion may be determined depending on the inlet temperature, about 80K, and the desired outlet pressure. In this embodiment, the outlet pressure is about 20 bar for circulation and passage through the Fuel Station feed line and Connector to the On-board Fuel Tank. The feed enters the fuel tank through the single-port Connector. The depletion in hydrogen flow due to adsorption in the fuel tank is made up from the $CGH_2$ supply. The mechanical energy produced in the Expander may be used efficiently to drive fuel station pumps.

The temperature drop achieved in the JT expansion may be managed in part by controlling the pressure of the 80K hydrogen gas as it is expanded through the throttle valve. Throttling is an isenthalpic process. For example, $T_i$, $P_i$ may indicate the inlet temperature and pressure of the hydrogen gas arriving at the throttle valve, and $T_f$, $P_f$ its exit condition after the expansion. Then, for given inlet conditions and exit pressure, the exit temperature may be determined by equating the gas enthalpies $H_g(T_i, P_i) = H_g(T_f, P_f)$. In this embodiment, the inlet temperature following heat exchange with liquid nitrogen is about 80K, and the intended delivery pressure to the On-board fuel tank is about 20 bar. Enthalpy data for hydrogen gas for a wide range of temperatures and pressures is available. From this data it is seen that the enthalpy at 20 bar (throttle exit stream) increases monotonically with temperature, in the region of interest. Hence, the enthalpy at 80 K (throttle inlet stream) should be as low as possible so that the temperature drop is maximized. Since the enthalpy at 80 K exhibits a minimum as pressure varies, the optimal inlet pressure for the throttle value is 153.65 bar (or about 153-154 bar). The applicable enthalpy data is as follows: $H_g$(80K, 153.65 bar)=899.1 kJ/kg=$H_g$(68.247K, 20 bar). Hence, the maximum temperature drop achieved with the specified throttle inlet temperature and throttle outlet pressure is 11.753 K (or about 11-12K).

If one chooses the inlet condition to the throttle valve as 350 bar and 80 K (assuming that higher pressure drop will give higher temperature drop), then $H_g$(80K, 350 bar)=991.75 kJ/kg=$H_g$(76.011K, 20 bar), giving only a 3.999 K temperature drop, about one-third the optimal value of 11.753 K. This inference depends only on the thermo-physical properties of hydrogen, and is unrelated to any fuel tank process. The existence of a high pressure minimum in hydrogen gas enthalpy has enabled a high temperature drop during the Joule-Thompson expansion. The flow rates required for achieving 5 or 10 minutes refueling with a 68.25 K feed are 88.7 g/s and 44.3 g/s, respectively.

Throttling is a free-expansion process. Hence, useful work is not derived during throttling. Modern hydrogen liquefaction processes consider intelligent combinations of Joule-Thompson (isenthalpic) and Reverse Brayton (isentropic) processes to derive useful work. Similar innovations could be implemented at the fuel station to get additional useful work (apart from the expander in FIG. 2) as a by product while achieving sub-cooling. Much useful work may be harnessed while depressurizing the compressed hydrogen from the supply pressure (350 bar) to the predetermined pressure for a JT expansion.

Hydrogen Supplied as Cryogenic Liquid

Figure 3:
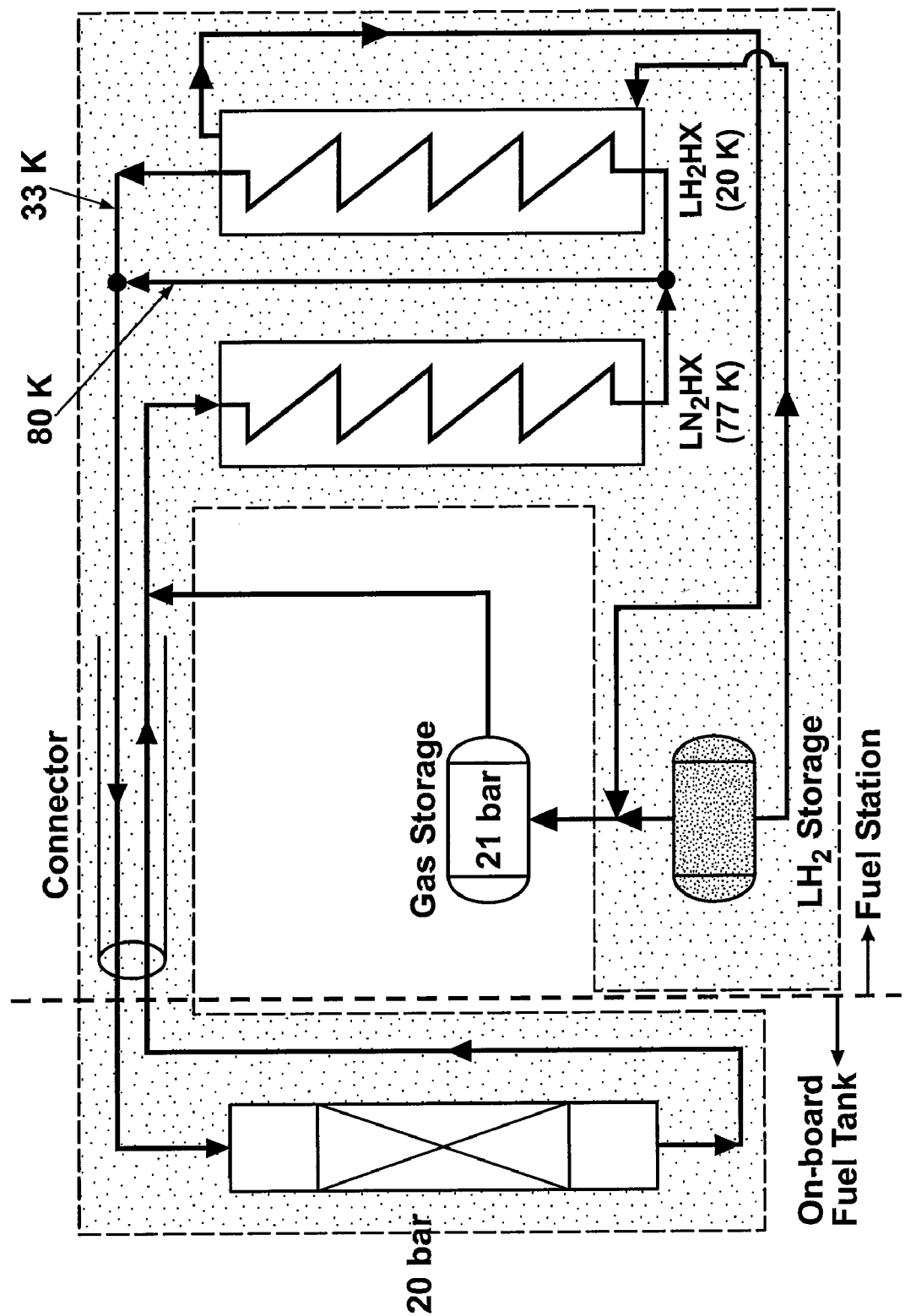
FIG. 3 is a schematic layout of a thermally insulated on-board fuel tank temporarily connected to a fuel station for the preparation of hydrogen from liquid hydrogen storage for adsorption by particulate adsorptive material in the fuel tank. The dashed line enclosed dotted portions of the figure indicate processing equipment and hydrogen flow lines that are thermally insulated.

FIG. 3 is a schematic drawing illustrating processing elements of a Fuel station to the right of the vertical dashed line and an On-board Fuel Tank of a vehicle (the vehicle is not shown) to the left of the vertical dashed line. In this embodiment liquid hydrogen ($LH_2$ storage) is available at the fuel station site. The On-board Fuel tank and the Connector apparatus for delivery of prepared hydrogen gas to the fuel tank may be of illustrative designs described above.

When hydrogen is supplied to the fuel station as a cryogenic liquid, it can be used to sub-cool the hydrogen gas feed to the fuel tank either by vaporizing $LH_2$ in a heat exchanger or by spray injecting it directly into the feed stream. FIG. 3 shows a fuel station layout using $LH_2$ heat exchanger for sub-cooling. The dashed-line enclosed dotted areas of FIG. 3 indicate low temperature processing stages and hydrogen flow lines that would be insulated.

Hydrogen vapor will boil-off from the $LH_2$ storage tank in maintaining the temperature (about 20K) of the $LH_2$. This hydrogen is vented to a hydrogen Gas storage (indicated schematically in FIG. 3). The hydrogen in Gas storage is held at a suitable pressure (e.g., about 21 bar) and resulting temperature. The pressure increase may be attained in part as the hydrogen temperature increases.

Upon demand for hydrogen, gas is withdrawn from Gas storage combined with any recycled hydrogen from a fuel tank and passed through a liquid nitrogen (77-80K) heat exchanger ($LN_2HX$ in FIG. 3). Passage through $LN_2$ HX cools the hydrogen refueling feed to about 80 K. Vaporized $LH_2$ generated in the $LH_2HX$ may be compressed and ducted to the Gas storage tank for eventual use in refueling. It is desired to further cool the 80K hydrogen stream well below its temperature for efficient refueling of the on-board fuel tank. This sub-cooling may accomplished using liquid hydrogen in different practices.

A portion of the 80K hydrogen stream is sub-cooled by passage through heat exchange with liquid hydrogen ($LH_2HX$). This portion of the 80K hydrogen is thus cooled to, for example, about 33K. Sub-cooled hydrogen at 33K may be remixed with the remaining hydrogen stream (at 80K) from the LN$_2$ heat exchanger. Thus, hydrogen gas refueling stream temperatures from about 33 K to 80 K can be achieved by adjusting the ratio of these two streams (i.e., the 80K hydrogen stream and the 33K hydrogen stream).

This feed of prepared hydrogen gas enters the on-board fuel tank through the single-port Connector. The exit gas returns to the fuel station through the same Connector. The exit gas being warmer may be re-circulated through the LN$_2$ and LH$_2$ heat exchangers. The depletion of hydrogen due to adsorption in the fuel tank is made up from the Gas storage tank. The boil-off from the LH$_2$ heat exchanger may be compressed and returned to the Gas storage tank after sufficient heat recovery.

In another embodiment of the invention, not illustrated in FIG. 3, a LH$_2$ spray injector is used to mix with and cool hydrogen from Gas storage. Use of a liquid hydrogen spray injector gives a simpler layout (lesser vapor handling equipments, lesser insulation etc) than the embodiments described using a LH$_2$ heat exchanger.

With a LH$_2$ spray injector LH$_2$ is vaporized within the circulating hydrogen gas stream. A limitation in either case is that the amount of LH$_2$ vaporized should not exceed the refueled amount, to avoid accumulation of gas phase over successive refueling. This criterion limits the degree of sub-cooling that can be achieved by vaporizing LH$_2$. In the FIG. 3 embodiment, the LH$_2$ heat exchanger is used downstream of LN$_2$ heat exchanger so that all cooling down to 80 K is done using the LN$_2$ heat exchanger, and LH$_2$ heat exchanger is used only for sub-cooling. This practice minimizes LH$_2$ vaporization.

Different embodiments for processing of hydrogen gas for adsorptive refueling of on-board fuel tanks have been provided. These descriptions are for illustrating the invention and are not limiting of the invention.

The invention claimed is:

1. A method of preparing hydrogen at a hydrogen re-fuelling site for adsorption of the hydrogen on a body of hydrogen adsorbent particles contained within an on-vehicle hydrogen storage tank of a vehicle brought to the site, the method comprising:
   providing hydrogen gas at a temperature above 80K;
   cooling the hydrogen gas by heat exchange with liquid nitrogen to a temperature of about 80K;
   further cooling the hydrogen gas to a temperature below about 80K; and
   circulating a stream of the further cooled hydrogen at a pressure of about 10-30 bar into and from contact with the body of hydrogen adsorbent particles where some hydrogen is adsorbed on the particles from the circulating hydrogen stream and the stream is heated by the body of particles as hydrogen is adsorbed on them.

2. A method of preparing hydrogen as recited in claim 1 in which at least some of the circulated hydrogen is again cooled by heat exchange with liquid nitrogen, further cooled to a temperature below about 80K, and recirculated into contact with the body of hydrogen adsorbent particles.

3. A method of preparing hydrogen as recited in claim 2 in which hydrogen is recirculated into contact with the body of hydrogen adsorbent particles until a desired adsorbed hydrogen content of the body is attained.

4. A method of preparing hydrogen at a hydrogen re-fuelling site for adsorption of the hydrogen on a body of hydrogen adsorbent particles contained within an on-vehicle hydrogen storage tank of a vehicle brought to the site, the method comprising:
   providing hydrogen gas from a source of compressed gas at a pressure in excess of 155 bar;
   cooling the hydrogen gas by heat exchange with liquid nitrogen to a temperature of about 80K;
   further cooling the hydrogen gas by an isenthalpic expansion to a temperature below about 70K and a pressure in the range of about 10-30 bar; and
   circulating a stream of the further cooled hydrogen into and from contact with the body of hydrogen adsorbent particles where some hydrogen is adsorbed on the particles from the circulating hydrogen stream and the stream is heated by the body of particles as hydrogen is adsorbed on them.

5. A method of preparing hydrogen as recited in claim 4 in which the hydrogen gas is further cooled by an isenthalpic expansion from a pressure of about 154 bar and a temperature of about 80K to a temperature below about 70K and a pressure in the range of about 10-30 bar.

6. A method of preparing hydrogen as recited in claim 4 in which at least some of the circulated hydrogen is again cooled by heat exchange with liquid nitrogen, further cooled to a temperature below about 70K, and recirculated into contact with the body of hydrogen adsorbent particles.

7. A method of preparing hydrogen as recited in claim 6 in which hydrogen is recirculated into contact with the body of hydrogen adsorbent particles until a desired adsorbed hydrogen content of the body is attained.

8. A method of preparing hydrogen at a hydrogen re-fuelling site for adsorption of the hydrogen on a body of hydrogen adsorbent particles contained within an on-vehicle hydrogen storage tank of a vehicle brought to the site, the method comprising:
   providing hydrogen gas from vaporized liquid hydrogen at a temperature above 80K;
   cooling the hydrogen gas by heat exchange with liquid nitrogen to a temperature of about 80K;
   further cooling the hydrogen gas to a temperature below about 80K using liquid hydrogen; and
   circulating a stream of the further cooled hydrogen at a pressure of about 10-30 bar into and from contact with the body of hydrogen adsorbent particles where some hydrogen is adsorbed on the particles from the circulating hydrogen stream and the stream is heated by the body of particles as hydrogen is adsorbed on them.

9. A method of preparing hydrogen as recited in claim 8 in which the hydrogen gas at about 80K is further cooled by heat exchange with liquid hydrogen to a temperature below about 70K.

10. A method of preparing hydrogen as recited in claim 8 in which the hydrogen gas at about 80K is further cooled by mixing liquid hydrogen with the hydrogen gas to a temperature below about 70K.

11. A method of preparing hydrogen as recited in claim 8 in which at least some of the circulated hydrogen is again cooled by heat exchange with liquid nitrogen, further cooled to a temperature below about 80K, and recirculated into contact with the body of hydrogen adsorbent particles.

12. A method of preparing hydrogen as recited in claim 8 in which hydrogen is recirculated into contact with the body of hydrogen adsorbent particles until a desired adsorbed hydrogen content of the body is attained.

* * * * *